(No Model.)
S. DENNIS.
RAT TRAP.
No. 324,925. Patented Aug. 25, 1885.
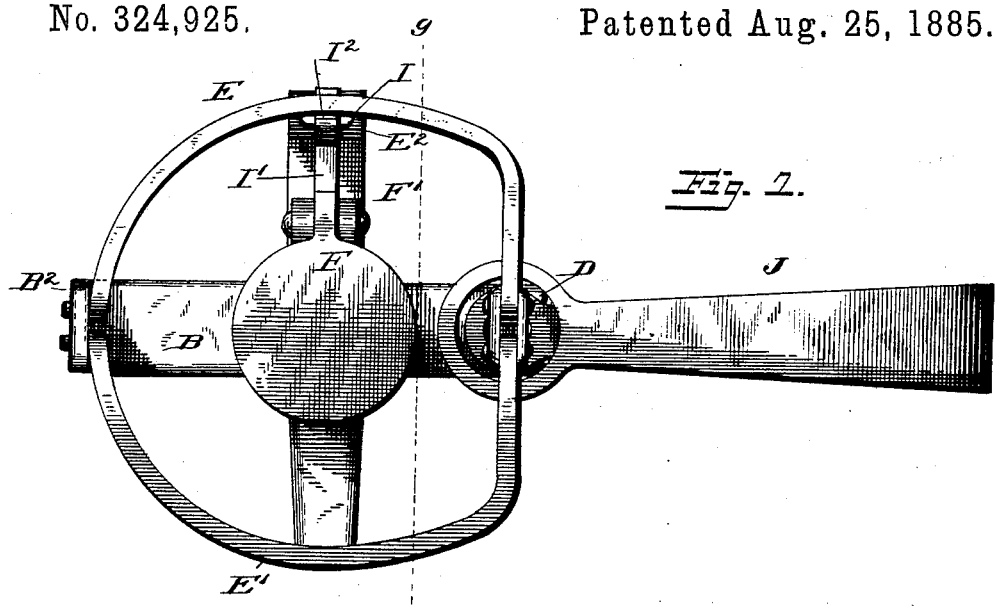
Fig. 1.
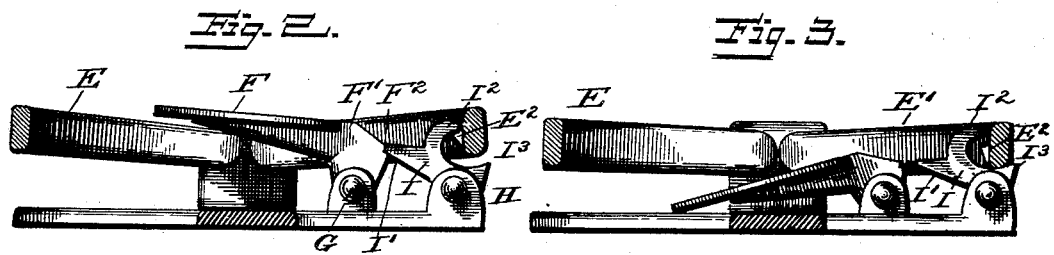
Fig. 2. Fig. 3.
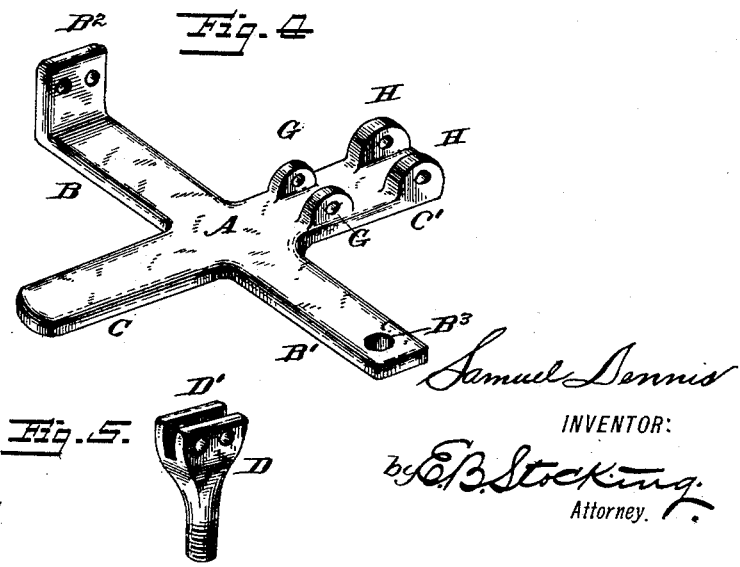
Fig. 4.
Fig. 5.
WITNESSES:
S. C. Hills,
Wm. S. Duvall
INVENTOR:
Samuel Dennis
by E. B. Stocking,
Attorney.
N. PETERS, Photo-Lithographer, Washington, D. C.

United States Patent Office.

SAMUEL DENNIS, OF HORNELLSVILLE, NEW YORK.

RAT-TRAP.

SPECIFICATION forming part of Letters Patent No. 324,925, dated August 25, 1885.

Application filed April 29, 1885. (No model.)

*To all whom it may concern:*

Be it known that I, SAMUEL DENNIS, a citizen of the United States, residing at Hornellsville, in the county of Steuben and State of New York, have invented certain new and useful Improvements in Rat-Traps, of which the following is a specification, reference being had to the accompanying drawings.

This invention relates to that class of traps for rats and other animals which are known as "jaw-traps;" and my object is to provide a simple cheap construction, which shall be easy of manufacture, durable, and effective in operation; and the invention consists in certain features of construction hereinafter described, and particularly pointed out in the claim.

Referring to the drawings, Figure 1 is a plan of a trap embodying my improvements, the same being shown as set. Figs. 2 and 3 are sections on the line $y\ y$ of Fig. 1. Fig. 4 is a detail of the base in perspective, and Fig. 5 is a detail hereinafter described.

Like letters indicate like parts in all the figures.

A represents a casting, which forms the base of my trap, and which is a single piece, provided with the projecting arms B B' C C'. The arm B of the casting A is turned up, or, if cast, formed with the upwardly-projecting perforated portion $B^2$, and the opposite arm B' is perforated as at $B^3$. Inserted through the perforation $B^2$ is a swivel, D, the lower end of which is screw-threaded and provided with a nut, and the upper end of which is bifurcated, as at D', and perforated.

E E' represent the jaws, which are held loosely in position by means of bolts or rivets passing through the perforations in the upwardly-projecting arm $B^2$ and bifurcations D.

F represents the bait-pan, which is suitably supported by an eccentrically pivoted arm, F', said arm being supported in perforated lugs G, formed on the casting A. In rear of these lugs, and in line therewith, are similarly-perforated lugs H, which form a bearing for a trigger, I, having the projecting portion I', the hooked portion $I^2$, and the setting shoulder $I^3$.

The jaws of the trap are operated in the usual manner by a flat or V spring, J, which is connected thereto by the swivel D.

To set the trap, press the spring together, and the jaws will by gravity drop apart and assume an open position. The jaw E will strike against the setting-shoulder $I^3$ of the trigger at a point outside of its pivot-line. This will cause the hook $I^2$ to rise to the position shown in Fig. 3, and when the spring is released will engage with the lug $E^2$ on the jaw E', as shown in Fig. 2, and thus hold the jaws in an open position. When the spring is pressed down, the bait-plate F must be elevated by the hand, so that the projecting portion I' of the trigger will rest in the shoulder $F^2$ of the arm or support F. It will now be seen that a rat or other animal touching the bait-pan or plate will cause the same to drop, thus relieving the trigger, which will drop by gravity and disengage itself from the lug $E^2$, which will allow the spring to exert its force upon the arms, and thus close and hold them tightly together. Not only is the trigger set by the weight of the jaw upon its shoulder $I^3$ so that its hook $I^2$ shall project above the lug $E^2$ on the jaw, but the projecting portion I' of the trigger is also held in such a position that the supporting-arm F' of the bait-pan will come in contact with the trigger in the proper notch made to receive the same, and therefore the only hand operation required in setting the trap is simply that of raising the bait-pan. By the invention of this trigger and its operation and construction there is no latch to throw the animal's foot out, as in other traps constructed with a latch.

This improvement applies to double as well as single traps.

Having described my invention and its operation, what I claim is—

In a trap of the class described, the jaws E E', lug $E^2$, trigger I, having the setting-shoulder $I^3$, hook portion $I^2$, and projection I', and the bait-pan F, its supporting-arm F', having the notch or shoulder $F^2$, and spring J, in combination with the base A, having the integrally-cast arms B B' C C', the lugs G and H, forming bearings for said trigger and bait-pan support, the swivel D, and upwardly-projecting lug $B^2$, substantially as specified.

In testimony whereof I affix my signature in presence of two witnesses.

SAMUEL DENNIS.

Witnesses:
C. W. STEVENS,
C. J. PATTEN.